Figure 1:
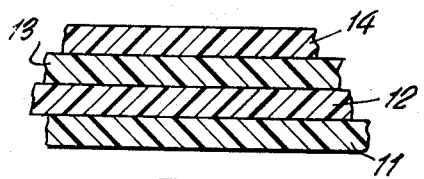

United States Patent

[11] 3,568,195

[72] Inventors Ludwig Wesch
 Heidelberg;
 Hans H. Meinke, Munich-Gauting, Germany
[21] Appl. No. 854,979
[22] Filed Nov. 23, 1959
[45] Patented Mar. 2, 1971
[73] Assignee said Wesch
[32] Priority Dec. 4, 1958
[33] Germany
[31] E16 822VIIIa/21a4

[54] ELECTROMAGNETIC WAVE ATTENUATING DEVICE
 19 Claims, 4 Drawing Figs.

[52] U.S. Cl. ................................................. 343/18
[51] Int. Cl. ........................................... H01q 17/00
[50] Field of Search ......................................... 343/18A; 343/18

[56] References Cited
 UNITED STATES PATENTS
 2,426,820 9/1947 Evans et al. .................... 343/18A
 2,951,246 8/1960 Halpern ........................ 343/18
 2,954,552 10/1960 Halpern ........................ 343/18

OTHER REFERENCES

C.I.O.S. Item No. 1, File No. XXVI-24, " The Schornsteinfeger Project" by the Combined Intelligence Objectives Sub-Commitee, May 1945, declassified Feb.19,1960, pps. 26—109, Copy in Div. 44.

NRL Report 4137," Darkflex" by H. A. Tanner et al, April 20, 1953, Naval Research Laboratory, Wash. D.C. 10 pages.

Summary Technical Report of Division 14, N.D.R.C. Volume 1, Washington D.C. (1946), " Radar: Summary Report and Harp Project," pages 100, 101, 116— 118, 127 128, 130 & 146 relied on, Copy in Div. 44

Primary Examiner—Rodney D. Bennett, Jr.
Assistant Examiner—Brian L. Ribando
Attorney—Kurt Kelman ABSTRACT: A radar wave absorber is disclosed which does not require a metal backing layer. The absorber operates according to interference principles, with a portion of the wave reflected from the absorber's back layer interfering with the wave reflected from the surface layer. The backing material must exhibit a high relative dielectric constant, or a high relative magnetic permeability and dielectric loss tangent, or a high magnetic loss tangent, or a combination of these properties.

PATENTED MAR 2 1971 3,568,195

INVENTORS
L. WESCH
BY HANS H. MEINKE

THEIR AGENT

ELECTROMAGNETIC WAVE ATTENUATING DEVICE

The present invention relates to devices for attenuating impinging radar waves. Such devices may be used to protect any object, including land, sea and air craft, containers, buildings, personnel and others, from detection by radar.

Electromagnetic wave attenuators based on the principle of interference between waves reflected from a reflective backing and waves emerging from the surface of the devices are known. Such wave interference absorbers have been successfully used in radar camouflage but the interference has always been based on the presence of a metallic backing for the wave attenuating layer or layers. The metallic backing layer may be a rigid metal plate, a thin and flexible metal sheet or a wire net of very small mesh size whose openings may in no case exceed the wavelength.

Experience has shown the application of laminated wave attenuators with a metallic backing to ships, aircraft or vehicles to be difficult. Difficulties have also been encountered in applying such laminates to wood, for instance. Furthermore, the wave attenuating layers of flexible laminates of this type often peel off the metallic backing when the laminates are bent or flexed for their application to an object to be camouflaged.

It is the primary object of the present invention to provide an electromagnetic wave attenuator of the indicated type without a metallic backing and which may be applied equally well to metal and to wood.

We have found that a relatively thin nonmetallic layer used as a backing for a radar wave attenuating means will so reflect an incident wave that the wave reflected from the backing will come into interference with the wave reflected from the surface of the wave attenuating portion of the laminate if the nonmetallic backing material has a high high frequency constant and high frequency loss.

The term "high frequency constant" is used throughout the specification and claims to designate the relative dielectric constant and/or the relative magnetic permeability of the backing material while the term "high frequency loss" refers to the dielectric loss tangent (dissipation factor) and/or the magnetic loss tangent of this material.

Thus, our backing material must have a high relative dielectric constant and/or a high relative magnetic permeability as well as a high dielectric loss tangent (dissipation factor) and/or a high magnetic loss tangent.

The relative dielectric constant may vary between 20 and 600, preferably 100 and 200. The range of the relative magnetic permeability of the backing is between 0.9 and 10, values above 1 being preferred. However, these values depend on the wave range since almost all relative magnetic permeabilities for wavelengths above 3 cm. are below 1. The dielectric loss tangent may be between 0.1 and 1.0, preferably 0.8. The magnetic loss tangent may be between 0.1 and 1.4, preferably 0.6 and 1.0.

As is known, a metallic backing in laminated electromagnetic wave attenuators causes a phase difference jump of $\pi$ for the electric field strength and the nonmetallic backing of the present invention approaches this phase jump.

Our experiments have shown that it is possible to come very close to a phase jump of $\pi$ with nonmetallic backings of the indicated high frequency characteristics and that any residual deviation from the desired phase reversal, for instance about 10°, 20° or more, may be eliminated by a suitable geometrical formation of the entire laminate.

The present invention is not concerned with the wave attenuating layer(s) of the laminate per se and apart from the combination with our novel backing sheet. Any suitable wave attenuating layer structure may be used, including those disclosed and claimed in one of the joint inventors' prior U.S. Pat. applications Ser. No. 505,826, filed May 3, 1955 by Ludwig Wesch for "Electromagnetic Wave Absorption Layer," now abandoned and substituted by Ser. No. 86,824, filed by Ludwig Wesch on Feb. 2, 1961 for "Device for Absorbing Electromagnetic Waves by Interference;" and Ser. Nos. 611,401, 611,403, and 611,406, filed Sept. 11, 1956 by Ludwig Wesch, the latter three applications having been abandoned and substituted by Ser. No. 86,823, filed by Ludwig Wesch for "Device for Absorbing Electromagnetic Waves by Interference."

Merely for purposes of illustration and in no way limiting the invention to the illustrated structures, in the accompanying drawing:

FIGS. 1 to 4 show cross sections of different embodiments of laminates according to the invention.

FIG. 1 shows a nonmetallic backing 11 according to the invention, which carries a phase-reversing film 12, a wave attenuating layer 13 and a surface layer 14 with a low dielectric constant, the wave attenuating laminate 12, 13, 14 being, for instance, of the type disclosed in application Ser. No. 86,823.

Figure 2:
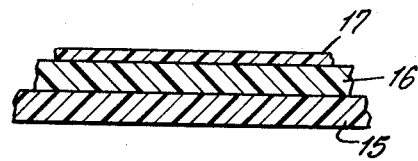

In FIG. 2, 15 designates the nonmetallic backing carrying a quarter-wavelength wave attenuating layer 16 and a conductive layer 17. The conductive layer should have a specific electric resistance of 377 ohm x cm. and meet the condition 1 kh. × 377 ohm, wherein $k$ is the conductivity of the layer and $h$ is its thickness in cm. If the medium which carries the layer has a relative dielectric constant $k'$, the resistance value is $377\sqrt{k'}$, $k'$ being the relative dielectric constant.

Figure 3:
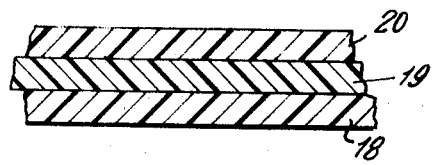

In FIG. 3, 18 designates the nonmetallic backing carrying two quarter wavelength wave attenuating layers 19 and 20 so that a double quarter wavelength laminate is obtained.

Figure 4:
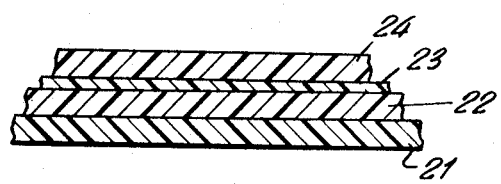

FIG. 4 illustrates a laminate consisting of nonmetallic backing 21, quarter wavelength layer 22 of low dielectric constant, a semiconductive layer 23 having a resistance of about 10 to 60 ohm cm., preferably 40 ohm, and a dielectric wave attenuating layer 24 whose dielectric constant decreases from layer 23 toward free space. The thickness of layer 24 is between one-third and one-tenth of the preferred wavelength to be absorbed, primarily about one-sixth of the wavelength in the material.

We have found a wave attenuating device with our novel nonmetallic backing to be less dependent on the incident wave angle for effective operation than the prior wave attenuators.

Preferred materials for our nonmetallic backing sheet, as shown at 11, 15, 18 and 21 in the drawing, are synthetic resins containing particulate fillers imparting very high high frequency losses to the backing. The synthetic resin may contain from about 30 percent to 80 percent, by weight, of the filler, the preferred proportion being about 60 percent to 80 percent, by weight. We have found graphite and conductive lampblack or carbon black mixtures of any desired proportion to give highly successful fillers for synthetic resin backings, about equal weight proportions of the carbon black and graphite in the mixture being satisfactory. However, any ratio in the range of 1 : 1 to 5 : 1 between graphite and carbon black may be used, and, if desired, either component may be used alone as a filler. If desired, permeable particulate fillers including ferrites, magnetites, $\gamma$ ferric oxide and iron powders made of iron pentacarbonyl may be used in addition to graphite and carbon black. The permeable high frequency iron powders may have a grain size of 0.1 to 100 $\mu$, preferably about 5 to 10 $\mu$ and give an excellent filler mixture with graphite and carbon black for the purposes of the invention.

While we prefer to use organic synthetic resins as binder material for our backing, inorganic binder materials may also be used. For instance, we have found cement containing the indicated fillers to be a useful binder material. If desired, organic binders may be added to such cement backings.

The following examples illustrate some specific electromagnetic wave attenuating devices with nonmetallic backings but it will be clearly understood that the invention is in no way limited to these examples. All parts in the examples are by weight.

EXAMPLE I

A reflective backing sheet for a wave attenuating such as shown at 11, 15, 18 or 21 in the drawing, was produced of a sheet of polyisobutylene containing graphite and carbon black as a filler. The composition of the backing sheet was as follows, all parts being by weight: 30 parts of polyisobutylene, 35 parts of graphite and 35 parts of carbon black.

Sheets of various thicknesses were made for different purposes, depending on the character of the wave attenuating layer(s) used with the backing and/or the waveband to be absorbed. Sheets of 2 mm. thickness were found effective in the waveband of 1 to 20 cm.

EXAMPLE II

The following synthetic rubber composition was extruded and vulcanized to form a 3 mm. backing sheet, such as shown at 11, 15, 18 or 21 in the drawing, all parts being by weight:

28.25 parts of butadiene acrylonitrile copolymer, sold under the trademark "Perbunan;"
30.00 parts of graphite;
28.50 parts of carbon black trademark "Corax 6;"
0.90 parts of diisocyanate, sold under the trademark "Desmodur TT;"
6.00 parts of plasticizer (methylene-bisthioblycollic acid dibutyl ester);
0.90 parts of stearic acid;
0.60 parts of paraffine;
2.00 parts of coumarone resin;
0.60 parts of sulfur;
0.75 parts of active ZnO;
1.05 parts of dibenzothiazylidisulfide, and
0.45 parts of diphenylguanidine.

A synthetic rubber sheet of this type was found to be an excellent backing for wave attenuating laminates in the waveband of 1 to 20 cm., particularly 3 to 10 cm.

The "Perbunan" base in the above example was replaced by other butadiene resins, including polybutadiene, standard synthetic rubbers, such as GR-S, GR-I, Neoprene type SN and Hycar-OR-25, as well as natural rubber, with substantially similar results.

Also, a portion of the graphite and/or carbon black filler was replaced by iron powder made of iron pentacarbonyl having an average grain size of 0.5 to 10 $\mu$, between about 5 percent and 30 percent, by weight of the composition, being used instead of the same amount of graphite or carbon black and excellent backing sheets were obtained.

While it is possible to finish the backing sheet first and then bond the wave attenuating layer structure to the vulcanized backing sheet in any suitable manner, for instance by use of a synthetic resin adhesive, layers containing a synthetic resin binder material may also be vulcanized to the synthetic resin backing while the latter is vulcanized.

As is known, the thickness of the wave attenuating layer means is $n\lambda/4$, wherein $n$ is any odd integer and $\lambda$ is the wavelength measured in the material. Two or more such quarter wavelength layers 19, 20 (FIG. 3) may be superimposed to form a wave attenuating layer structure for a broad waveband.

As disclosed in the above-identified Pat. applications Ser. No. 86,823 of one of the joint inventors, it has proved advantageous to split such layers into a plurality of films and, as shown at 12 in FIG. 1, to insert a phase-reversing layer between the reflective backing and the wave attenuating layer structure 13, 14.

The following radar wave attenuating laminate has been found highly effective in obtaining an attenuation of 20 to 40 $db$ in the wave range around 3.2 cm. and still obtains an attenuation of about 7 to 12 $db$ in a wave range of about 5 cm.

EXAMPLE III

The laminate consisted of the 3 mm. backing sheet of Example II, a 1.5 mm. polyvinylchloride adhesive film and a superposed 0.7 mm. wave attenuating film of the following composition, all parts being by weight:

19 parts of butadiene acrylonitrile copolymer "Perbunan;"
76 parts of magnetite (average grain size 0.5 to 5 $\mu$);
0.90 parts of diisocyanate "Desmodur TT;"
0.50 parts of active ZnO;
0.60 parts of stearic acid;
0.40 parts of paraffin;
0.40 parts of sulfur;
2.00 parts of coumarone resin; and
0.20 parts of accelerator.

All three layers were heated simultaneously on an automatic vulcanizing apparatus, which caused the two synthetic rubber layers to be vulcanized while the thermoplastic polyvinylchloride film welded the vulcanized layers together.

Such a laminate constitutes a considerable advantage over laminates with metallic backing because it is fully flexible and may be applied to any type of background, including metal and wood surfaces as well as objects of other materials. It may also be used as a separate protective cover positioned over any object to be protected against detection by radar.

Another laminate according to the invention may comprise essentially the nonmetallic backing of Example I or II, a quarter-wavelength butyl rubber layer 16 bonded thereto and a conductive coating 17 having a resistance of 377 ohms × cm. over the butyl rubber layer, the conductive coating may consist of pure graphite "Aquadag" or a conductive lacquer.

EXAMPLE IV

A radar wave attenuator with an average attenuation of 15 to 20 $db$ in the wave range of 3 to 7 cm. was produced from a three-ply laminate of the following structure, as shown in FIG. 1 but omitting the phase-reversing layer:

1. The 3 mm. backing sheet 11 of Example II;
2. A 2 mm. wave attenuating layer 13 of the composition of the top layer of Example III; and
3. A 5 mm. layer 14 of polyvinylchloride superposed thereover.

EXAMPLE V

An inorganic backing sheet for any of the illustrated laminates was produced from the following composition:

20 parts of Portland cement;
30 parts of gravel, grain size: sieve line E;
30 parts of powdered graphite containing 99.6 percent carbon; and
20 parts of carbon black.

About 0.5 parts of water were used for seven parts of the above mixture to produce a cement useful for making backing sheets. The wave attenuating layers were then applied by spraying or bonding to the inorganic cement backing sheet.

Generally, Portland cements, iron-Portland cements, and blast-furnace-slag cements may be used, as well as concrete and sulfate blast-furnace cements.

The nonmetallic backing for electromagnetic wave attenuating laminates adds a new wave attenuating element to devices of this type and thus broadens the waveband in which such devices are effective. This improvement in the high frequency characteristics of the device, together with the mechanical advantages thereof over devices with a metallic backing, constitutes a considerable advance in the art.

While the invention has been described in connection with certain preferred embodiments thereof, it will be clearly understood that many variations and modifications may occur to the skilled in the art, particularly after benefiting from the present teaching, without departing from the spirit and scope of this invention as defined in the appended claims.

We claim:

1. An improved device for attenuating impinging radar waves by interference, consisting of the combination of an outer radar wave attenuating layer means having a surface reflecting one part of the impinging waves and a wave reflecting backing reflecting the other part of the impinging waves, which have penetrated into the layer means, said backing being a nonmetallic sheet having a relative dielectric constant of between 20 and 600, and a relative permeability of between 0.9 and 10.

2. The device of claim 1, wherein the relative dielectric constant of the nonmetallic backing is between 100 and 200, and the relative permeability is about 1.

3. The device of claim 1, wherein the nonmetallic backing consists of a dielectric binder material containing a particulate filler controlling the high frequency constant of the backing.

4. The device of claim 1, wherein the nonmetallic backing consists of a dielectric base material selected from the group consisting of concrete and cement containing a particulate filler controlling the high frequency constant of the backing.

5. The device of claim 1, wherein the nonmetallic backing consists of a dielectric base material containing a particulate filler selected from the group consisting of iron, ferrites, magnetites and mixtures thereof, having a grain size of 0.1 to 100 microns.

6. The device of claim 1, wherein the nonmetallic backing is composed essentially of a synthetic resin containing a particulate filler imparting a high high frequency loss to the backing.

7. The device of claim 6, wherein said synthetic resin is a synthetic rubber.

8. The device of claim 7, wherein said synthetic rubber is selected from the group consisting of butyl rubber and a butadiene-base rubber.

9. The device of claim 6, wherein at least the major portion of the particulate filler consists of graphite.

10. The device of claim 6, wherein at least the major portion of the particulate filler consists of carbon black.

11. The device of claim 6, wherein at least the major portion of the particulate filler consists of graphite and carbon black.

12. An improved device for attenuating impinging radar waves by interference, consisting of the combination of an outer radar wave attenuating layer means having a surface reflecting one part of the impinging waves and a wave reflecting backing reflecting the other part of the impinging waves, which have penetrated into the layer means, said backing being a sheet composed essentially of polyisobutylene and a particulate filler of graphite and carbon black, the backing sheet having a thickness of the order or magnitude of a few millimeters.

13. The device of claim 12, wherein the weight ratio of the polyisobutylene, graphite and carbon black is about 2 : 4 : 4.

14. An improved device for attenuating impinging radar waves by interference, consisting of the combination of an outer radar wave attenuating layer means having a surface reflecting one part of the impinging waves and a wave reflecting backing reflecting the other part of the impinging waves, which have penetrated into the layer means, said backing being a sheet composed essentially of a synthetic resin containing from about 30 percent to about 80 percent, by weight, of a particulate filler imparting a high high frequency loss to the backing sheet, at least a major portion of said filler consisting of a mixture of graphite and carbon black.

15. The device of claim 14, wherein the filler includes a minor portion of at least one permeable high frequency iron powder.

16. An improved device for attenuating impinging radar waves by interference, consisting of the combination of an outer radar wave attenuating layer means having a surface reflecting one part of the impinging waves and a wave reflecting backing reflecting the other part of the impinging waves, which have penetrated into the layer means, said backing being a sheet composed essentially of a vulcanized butadiene acrylonitrile copolymer, graphite and carbon black.

17. The device of claim 16, wherein the butadiene acrylonitrile copolymer, graphite and carbon black are present in about equal proportion, by weight.

18. An improved device for attenuating impinging radar waves by interference, consisting of the combination of (1) a radar wave attenuating layer means having a surface reflecting one part of the impinging waves, said layer means having a thickness of approximately $n\lambda/4$, wherein $n$ is any odd integer and $\lambda$ is the wavelength of the impinging waves measured in the layer means, and (2) a wave reflecting backing reflecting the other part of the impinging waves, which have penetrated into the layer means, said backing being a nonmetallic sheet having a relative dielectric constant of between 20 and 600, and a relative permeability of between 0.9 and 10.

19. The device of claim 18, further comprising an outer conductive coating having a resistance of 377 ohms cm. on the wave absorbing layer structure.